United States Patent [19]

Jordan

[11] 4,416,767

[45] Nov. 22, 1983

[54] METHOD AND APPARATUS FOR THE REMOVAL OF EXCESS SODIUM REAGENT AND BYPRODUCTS OF REACTION PRODUCED DURING THE DESTRUCTION AND REMOVAL OF POLYCHLORINATED BIPHENYLS FROM OIL

[75] Inventor: Otis D. Jordan, North Canton, Ohio

[73] Assignee: Sun-Ohio, Inc., Canton, Ohio

[21] Appl. No.: 322,018

[22] Filed: Nov. 16, 1981

[51] Int. Cl.³ .................. C10G 29/04; C02F 1/70; C02F 1/38; C02F 1/40

[52] U.S. Cl. .................. 208/262; 585/469; 422/189; 422/256; 210/634; 210/712; 210/718; 210/719; 210/738; 210/757; 210/781; 210/806; 210/101; 210/120; 210/136; 210/137; 210/167; 210/199; 210/206; 210/218; 210/219; 210/909

[58] Field of Search .............. 210/702, 718, 719, 720, 210/721, 722, 724, 738, 749, 751, 750, 757, 758, 765, 101, 120, 136, 137, 167, 177, 180, 199, 206, 218, 219, 780, 799, 800, 801, 804, 909, 806; 261/29, 52, 65, DIG. 7; 208/179, 181, 182, 262

[56] References Cited

U.S. PATENT DOCUMENTS

| | | | |
|---|---|---|---|
| 1,045,096 | 11/1912 | Neil | 210/738 |
| 1,339,682 | 5/1920 | Allen | 210/801 |
| 1,490,794 | 4/1924 | Alexander | 210/801 |
| 1,505,841 | 8/1924 | Alexander | 210/801 |
| 1,592,305 | 7/1926 | Lewis | 261/DIG. 7 |
| 1,598,787 | 9/1926 | Shields | 261/DIG. 7 |
| 1,973,607 | 9/1934 | Bunn | 210/787 |
| 1,984,617 | 12/1934 | Williams | 261/DIG. 7 |
| 3,345,288 | 10/1967 | Sontheimer | 210/724 |
| 3,572,550 | 3/1971 | Colomina | 201/DIG. 7 |
| 3,736,254 | 5/1973 | Croom | 210/724 |
| 3,780,198 | 12/1973 | Pahl | 261/DIG. 7 |
| 3,806,452 | 4/1974 | Walker | 210/749 |
| 3,877,358 | 4/1975 | Karr | 261/DIG. 7 |
| 3,893,659 | 7/1975 | Krish | 210/738 |
| 4,188,291 | 2/1980 | Anderson | 210/724 |
| 4,217,217 | 8/1980 | Kay | 210/749 |
| 4,256,578 | 3/1981 | Kozar | 210/766 |
| 4,284,516 | 8/1981 | Parker et al. | 210/757 |
| 4,299,704 | 11/1981 | Foss | 210/634 |

FOREIGN PATENT DOCUMENTS 49-82570 8/1974 Japan .

OTHER PUBLICATIONS

"A Complete Dechlorination of Polychlorinated Biphenyl by Sodium Naphthalene," *Chemistry and Industry*, Nov. 4, 1978 by Akira Oku, Kenjiro Ysufuku and Hideto Kataoka.
"Detoxifying PCB-Contaminated Transformer and Heat-Transfer Fluids," *Plant Engineering*, Aug. 21, 1980, pp. 133 & 134, by D. K. Parker and W. L. Cox.
"Goodyear Develops PCB Removal Method", Sep. 1, 1980, C & EN, p. 9.

*Primary Examiner*—Ernest G. Therkorn
*Attorney, Agent, or Firm*—Oldham, Oldham, Hudak, Weber & Sand Co.

[57] ABSTRACT

A method for removing the excess sodium and byproducts of reaction which occur during the destruction of PCBs from oil. A predetermined quantity of water is mixed with the decontaminated oil and the byproducts, which include sodium chloride and polyphenyl polymer, to form sodium chloride and sodium hydroxide. Centrifuging removes most of the oil from the remaining aqueous mixture which then is agitated and treated with carbon dioxide gas to form less hazardous sodium carbonate and sodium bicarbonate. Any excess carbon dioxide gas is vented to the atmosphere and the sodium carbonate and sodium bicarbonate is collected into containers for disposal. Small amounts of oil remaining in the aqueous waste mixture that is discharged from the centrifuge is decanted from the remaining material in a waste separator due to its lighter specific gravity. A pump intermittently injects waste from the waste separator into a converter where it reacts with the carbon dioxide gas. A corresponding amount of the treated waste is ejected from the converter and collected in waste containers. A releif valve on the discharge end of the converter is adjusted to a valve lower than a check valve in the carbon dioxide gas incoming line to ensure a sufficient supply of gas in the converter. A pump continuously agitates and recirculates the waste material in the converter to ensure a thorough mixing and reaction with the carbon dioxide gas.

19 Claims, 5 Drawing Figures

4,416,767

METHOD AND APPARATUS FOR THE REMOVAL OF EXCESS SODIUM REAGENT AND BYPRODUCTS OF REACTION PRODUCED DURING THE DESTRUCTION AND REMOVAL OF POLYCHLORINATED BIPHENYLS FROM OIL

BACKGROUND OF THE INVENTION

1. Field of the Invention

The invention relates to a method and apparatus for removing excess sodium reagent and the byproducts which are produced during the destruction and removal of polychlorinated biphenyls (PCBs) from fluids, and in particular from transformer oils. More particularly, the invention relates to a method and apparatus therefor in which the sodium is rendered less hazardous facilitating its removal from the oil for subsequent disposal, and in which virtually all of the decontaminated oil is separated from the waste products and returned for reuse.

2. Description of the Prior Art

Polychlorinated biphenyls (PCBs) are very stable compounds which are not destroyed by natural processes. Recently, their use has been banned for environmental reasons due to the possible danger to the environment and inhabitants. PCBs are not destroyed by natural processes and they are not biodegradable and will not disappear or decay to any extent by natural processes. Once they are formed, they can be destroyed only by special and expensive procedures.

Because of their thermal stability and nonflammable properties, PCBs have been used extensively as electrical insulating fluids and in dielectric materials such as in transformers and in capacitors. Although further use of PCBs for such purposes has been banned, huge quantities of these chemicals are present in the country today, especially in the electrical industry. Also, there is a vast amount of PCBs in storage awaiting a sure and inexpensive method of disposal. PCBs can be burned but only at a very high temperature and under rigidly controlled conditions. To date, incineration programs have not been entirely successful. PCBs also have been disposed of by burial, but this means of disposal presents the same risks that discourage the burial of any hazardous substance.

By the time PCBs were recognized as a hazard to health and the environment, they were widely disseminated in all compartments of the biosphere. Except in those instances where the concentration is great and the contaminated area is small, little can be done to correct the problem. Only time can do so, and the extraordinary stability of these chemicals suggests that it will be an exceedingly long time for destruction of these chemicals by natural processes. Due to the vast quantities of PCBs still in use today, eventual escape of these materials into the environment can be prevented only by an effective program and system for their destruction. It is estimated that oil-insulated transformers alone which are contaminated with more than 50 ppm of PCBs account for six hundred million gallons of contaminated oil. Add to this all the pure PCBs still in use for other purposes, and it is apparent that sensor or later a major portion of these PCBs will find their way into the environment unless a satisfactory means of disposal or destruction of PCBs is developed.

The incineration of the PCB-contaminated transformer oil used by some segments of the industry today results in the destruction of approximately twelve thousand pounds of transformer oil to get rid of approximately one pound of PCB. Likewise, the burial or incineration of PCBs or materials contaminated therewith also requires risky transportation to approved disposal sites, with the resulting dangers always present therewith.

Recently several methods have been developed for chemically removing PCBs and similar halogenated aromatic hydrocarbons from oils contaminated with such hazardous materials. One particular method and apparatus for the removal and destruction of PCBs is disclosed and claimed in my earlier U.S. Pat. No. 4,340,471. The method and apparatus disclosed in this patent has been found to be highly satisfactory for decontaminating oils containing PCBs.

However, in the continuous chemical destruction of halogenated hydrocarbons, such as PCBs, contained in the transformer insulating fluids by the apparatus disclosed in my copending application, it is necessary that an excess amount of sodium be added which is over and above the amount necessary for combining with the chlorine atoms of the PCBs to achieve maximum destruction of the PCBs. This necessitates removal of this excess sodium from the oil before it can be returned for reuse. This excess sodium is extremely difficult to remove in its elemental form by conventional techniques. Also, this elemental sodium is a hazardous material, difficult to handle and dispose. Furthermore, the polyphenyl polymer that is formed when the chlorine atoms are stripped away from the polychlorinated biphenyl molecules is an extremely difficult substance to remove from the fluid by filtration, either by itself or in combination with the excess sodium.

Unless a large portion of these substances is removed from the oil by some means other than filtration, the excess sodium and byproducts will clog the filters including Fuller's earth beds, requiring frequent changing of the filter medium. Since the frequent changing of filter medium is troublesome and costly, and since the discarded filter medium carries with it a certain amount of valuable oil, it is desirable that the filter medium be used as long as possible before eventually being replaced.

There is no known method and apparatus of which I am aware which enables the excess sodium reagent and byproducts of reaction which are produced during the destruction and removal of halogenated aromatic hydrocarbons from fluids, and particularly PCBs from oil, to be removed from the oil in a relatively inexpensive and highly efficient manner other than my method and apparatus set forth and described below.

SUMMARY OF THE INVENTION

Objectives of the invention include providing an improved method and apparatus for the removal of excess sodium reagents and byproducts of reaction which are produced during the destruction and removal of halogenated aromatic hydrocarbons from fluids, and particularly of polychlorinated biphenyls (PCBs) from transformer oils, whereby the excess sodium is rendered less hazardous, and in which virtually all of the fluid or transformer oil is separated from the waste products and returned to its original use. Another objective is to provide such a method and apparatus in which the equipment therefor can be assembled in a compact arrangement on portable units such as trailers/tractor rigs for incorporation with existing processing equipment which destroys the PCBs whereby the waste products can be rendered less hazardous at the job site eliminating transportation of hazardous materials, in which these less hazardous waste products can be stored in containers for subsequent transportation to a chemical disposal site, and in which the amount of waste products recovered is extremely small in relationship to the amount of oil decontaminated and returned for reuse.

Another objective is to provide such a method and apparatus in which a centrifuge removes most of the decontaminated oil from the waste products for return into the system or storage tanks, eliminating the problems that heretofore were encountered with clogging of conventional filtering media such as Fuller's earth beds, in which the returning decontaminated and purified oil can be passed through a polishing filtering medium before being returned to the original system or storage, and in which the amount of waste material and fluid removed from the centrifuge is extremely small in comparison to the amount of decontaminated oil being returned to the system. Still another objective is to provide such a method which does not require extremely expensive equipment for operation and which requires a relatively small amount of energy for carrying out the method, in which the waste products are rendered less harmful and hazardous than in prior systems, and in which the method combines various components and apparatus that assure the products of reaction will be completely removed from the decontaminated oil and that only traces of oil are contained in the final waste product. Another objective is to provide such a method and apparatus which eliminates difficulties existing in the art, solves problems, satisfies needs and obtains new results.

These objectives and advantages are obtained by the improved system for the removal of an excess sodium reagent and byproducts of reaction used and produced during the destruction and removal of polychlorinated biphenyls from a contaminated oil in which said byproducts include sodium chloride and polyphenyl polymer, the general nature of said method including the steps of mixing a predetermined quantity of water with the oil and byproducts to form an aqueous mixture containing oil, sodium hydroxide and sodium chloride, said quantity of water being sufficient to convert all of the excess sodium to sodium hydroxide and to dissolve and hold in solution said sodium hydroxide; separating the oil from the aqueous mixture in a centrifuge; removing the separated oil from the centrifuge; and treating the waste aqueous mixture being separated from the oil by the centrifuge into less harmful byproducts for subsequent disposal.

These objectives and advantages are further obtained by the apparatus used for the removal of excess sodium and byproducts of reaction which were used and produced during the destruction and removal of polychlorinated biphenyls from a contaminated oil, the general nature of which may be stated as including means for mixing a predetermined quantity of water with the oil to form an aqueous mixture containing oil, sodium hydroxide and sodium chloride; centrifuging means for separating the oil from the aqueous mixture; a supply of gas; means for mixing gas from the supply of said gas with the aqueous mixture which remains after the oil has been removed therefrom to form less harmful byproducts; and means for collecting and storing the less harmful byproducts produced from the aqueous mixture after mixing with the gas.

BRIEF DESCRIPTION OF THE DRAWINGS

A preferred embodiment of the invention, illustrative of the best mode in which the applicant has contemplated applying the principles, is set forth in the following description and shown in the drawings, and is particularly and distinctly pointed out and set forth in the appended claims.

Similar numerals refer to similar parts throughout the drawings.

DESCRIPTION OF THE PREFERRED EMBODIMENT

Figure 1:
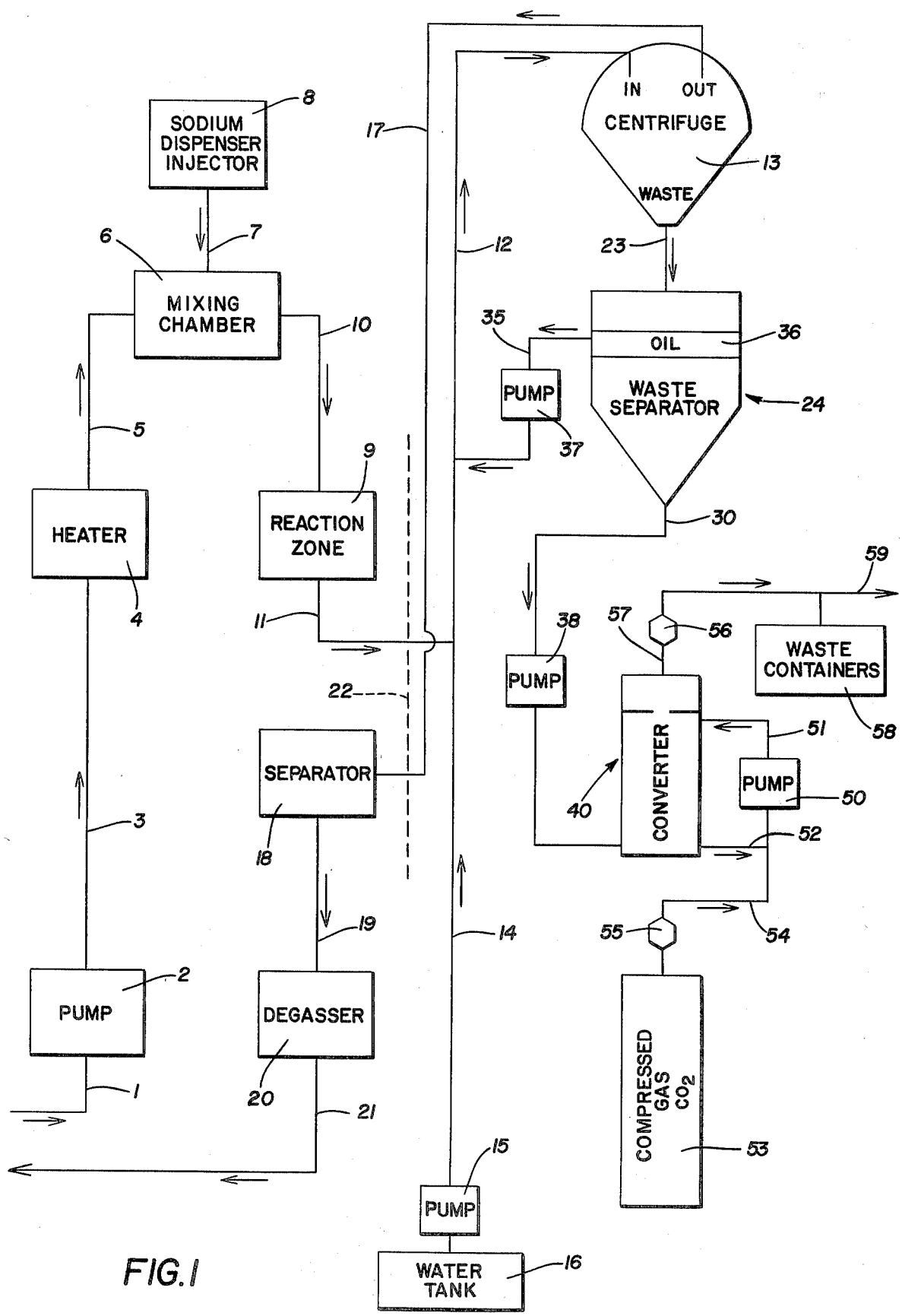
FIG. 1 is a diagrammatic block diagram of the improved method and apparatus therefor.

FIG. 1 is a diagrammatic block diagram of the improved apparatus and arrangement thereof for carrying out the steps of the improved method. The particular apparatus and arrangement shown on the left-hand portion of the dotted line in the drawing is the existing equipment which produces the byproducts and excess sodium reagent, with the apparatus and arrangement shown on the right-hand side of the drawing being the improvements of the invention.

In an existing system for the continuous destruction of halogenated hydrocarbons, and particularly of polychlorinated biphenyls contained in transformer oil of the type described in my earlier U.S. Pat. No. 4,340,471 discussed above or by the methods described in U.S. Pat. Nos. 4,379,752 and 4,379,746, the PCB-contaminated oil enters the system through an incoming line 1. Line 1 can be connected directly to a power transformer or other piece of electrical equipment containing contaminated oil or to a storage tank containing the oil. A pump 2 forces the oil through a line 3 and into a heater 4 where the temperature of the contaminated oil is raised to a predetermined level for achieving the most efficient reaction with the particular reagent that is being used in the system, which preferably is sodium. The transformer oil preferably is heated to within a range of 120° C. to 130° C.

After leaving heater 4 through a line 5, the heated oil enters a mixing chamber 6. While in mixing chamber 6, the heated fluid encounters the reagent which for PCB-contaminated transformer oil preferably is a dispersion of elemental sodium. The elemental sodium reagent is injected into mixing chamber 6 through a line 7 at a predetermined rate by a dispenser/injector mechanism 8 which may be of the type described in my copending application Ser. No. 199,261.

After receiving and being mixed with a predetermined amount of sodium in mixing chamber 6, the oil-sodium mixture flows into a reaction zone 9 through line 10. In the temperature range of 120° C. to 130° C., the sodium dispersion will become liquid and comingle freely with the PCB-contaminated transformer oil. After the oil-sodium mixture completes its journey through reaction zone 9, the reaction between the sodium and PCB is largely complete, and the PCBs are broken down into the byproducts of the chemical reaction which takes place in reaction zone 9.

It is desirable that the temperature of the decontaminated oil leaving reaction zone 9 through line 11 be reduced to below the melting point of sodium (97.83° C.) so that the excess sodium may solidify from the liquid state for subsequent removal by the improved method described below. Lowering of the temperature of the byproducts of the reaction also accelerates the acervation of the byproduct polymers, making them more susceptible to separation.

The fluid mixture leaving reaction zone 9 in line 11 contains the decontaminated oil together with the byproducts of reaction which include excess sodium reagent, sodium chloride which is produced by the reaction between the chlorine atom of the PCB and a portion of the sodium, and polyphenyl polymer which is formed when the chlorine is stripped from the PCB by the sodium.

The mixture enters line 12 from line 11 and proceeds toward a centrifuge 13. As the fluid mixture proceeds toward centrifuge 13, it is mixed with water which is injected into line 12 through line 14 from a water supply tank 16 by a pump 15.

In accordance with the invention, the amount of water that is injected into the fluid entering line 12 is regulated so as to be in excess of the amount necessary to convert all of the excess sodium to sodium hydroxide (NA OH) and to completely dissolve and hold in solution the formed sodium hydroxide. Further, the amount of water added is in excess of the amount needed to hold in solution all excess sodium in the sodium bicarbonate form ($NAHCO_3 + H_2O$) at the lowest temperature that may prevail at the exit point of the waste products from the system. Furthermore, enough water is added through line 14 to hold in solution all sodium chloride (NACO) formed by the preceding reaction of sodium with the chlorine of the PCB in reaction zone 9. Thus, the amount of water required to be injected into line 14 by pump 15 can be calculated easily from the particular known input parameters. The hydrogen formed by the reaction between the water and the excess sodium may be diluted by injecting nitrogen into the system from a canister of pressurized nitrogen gas or the like at some convenient location, such as in line 3 or 5.

The aqueous fluid containing the polymeric byproducts, the sodium hydroxide solution and the sodium chloride solution and excess water, enters centrifuge 13 through line 12. Centrifuge 13 may be of the type sold by Westfalia Separator AG of Oelde, West Germany, as Model SA 20-06-076. In this type of centrifuge the lighter oil is continuously discharged through the outlet line 17 and the waste material is discharged at intervals through line 23. The oil has a lighter specific gravity than that of the other byproducts in the aqueous solution which enters centrifuge 13 through line 12 and therefore is removed easily by the centrifuge and discharged through outlet line 17. Separation efficiencies of above 99.95 percent are typical for centrifuge of the type described above.

The decontaminated oil discharged from centrifuge 13 enters a separator 18 through line 17 for further processing. Separator 18 preferably is a filtration unit of the type containing a Fuller's earth filtering medium which provides a "polishing" filtering effect of the decontaminated oil to completely remove any suspended solids or other impurities remaining in the oil. Since the excess sodium reagent and other byproducts of reaction have been removed from the oil in centrifuge 13 before entering separator 18, the Fuller's earth beds will require little maintenance and replacement since very little foreign material will be collected therein. Furthermore, none of the materials collected in the Fuller's earth beds of separator 18 are hazardous or harmful to health or the environment and can be disposed of in a conventional waste-dumping manner.

The cleansed oil after passing through separator 18 where any remaining solids are removed, then is fed through a line 19 into a vacuum degasser 20. The interior of degasser 20 is connected to a deep vacuum which will draw off any gasses which may have been entrained in or dissolved in the oil leaving separator 18. Most gases, including water vapor, which would be withdrawn from degasser 20 are harmless and can be discharged directly into the surrounding atmosphere. The decontaminated and purified oil leaves degasser 20 by line 21 where it can be returned directly into the transformer or other piece of electrical equipment being decontaminated, or else into a storage tank for reuse.

The various apparatus and arrangement thereof which is shown on the left-hand side of dotted line 22 of FIG. 1 is for illustrative purposes only and can include other apparatus and arrangements associated therewith without affecting the concept of the invention. The particular equipment shown in FIG. 1 shows one type of system in which the chemical reaction which occurs during the destruction and removal of PCBs from a contaminated oil includes the excess sodium and other byproducts which are removed by the improved method and apparatus of the present invention.

Figure 2:
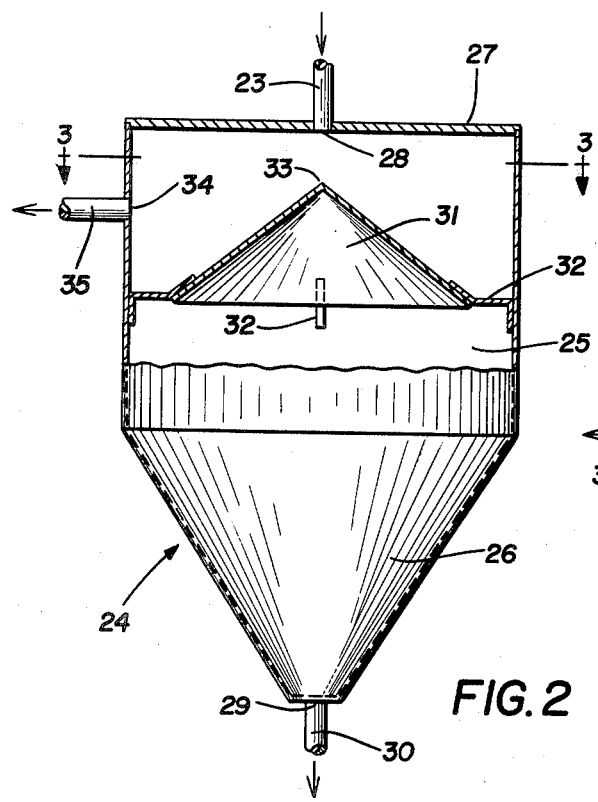
FIG. 2 is an enlarged elevational view, portions of which are broken away and in section, of the waste separator apparatus of the invention.
Figure 3:
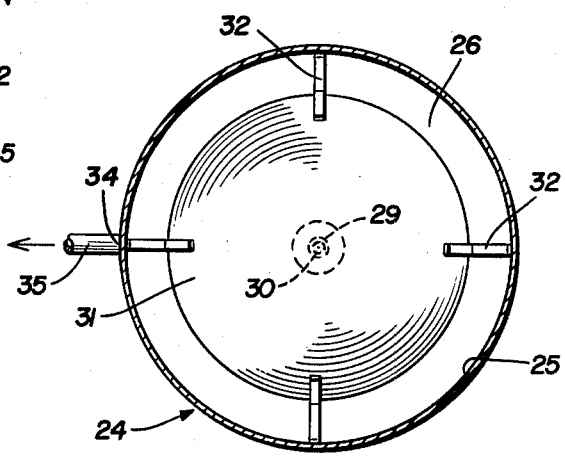
FIG. 3 is a sectional view taken on line 3—3, FIG. 2.

The waste materials that remain in centrifuge 13 after removal of the majority of the oil through line 17 consist of an aqueous mixture of sodium hydroxide and sodium chloride with polymeric byproducts and a small quantity of oil not removed by centrifuge 13. These waste materials are ejected in a periodic discharge fashion from centrifuge 13 through line 23 and enter a waste separator 24. Separator 24 may have various configurations, one particular type of which is shown in FIGS. 2 and 3.

Separator 24 preferably is a funnel-shaped hopper constructed of stainless steel having a cylindrical tip portion 25 and an inverted cone-shaped bottom portion 26. The upper end of cylindrical top portion 25 has a circular top closure wall 27 formed with an inlet opening 28 which communicates with incoming line 23. Cone-shaped bottom portion 26 is formed with a bottom opening 29 which communicates with a discharge line 30. A cone-shaped baffle 31 is mounted within cylindrical top portion 25 of separator 24 by a plurality of mounting brackets 32. The apex 33 of baffle 31 preferably is located vertically beneath inlet opening 28 whereby the incoming waste materials strike the baffle and flow gradually down along the sides thereof and into the lower portion of separator 24. An oil outlet opening 34 is formed in the upper portion of cylindrical top 25 and communicates with an oil discharge line 35.

The oil contained within the waste materials entering separator 24 has a lighter specific gravity than the specific gravity of the other materials. This will enable the oil to rise to the top of the aqueous mixture and form an upper layer which is indicated by numeral 36 in FIG. 1. The separated oil is decanted from the top of the remaining waste products through opening 34 by a pump 37, which is located in oil discharge line 35. Pump 37 runs periodically to ensure the removal of the top oil layer prior to the level of the remaining waste materials reaching opening 34. This decanted oil reenters line 12 and is returned into the centrifuge 13 with the other materials for subsequent centrifuging and waste separating. Waste separator 24 ensures greater salvage of the decontaminated oil by removing the small amount of oil remaining in the aqueous waste mixture which is not removed by centrifuge 13 and returns it into the system flow for subsequent reuse.

Figure 4:
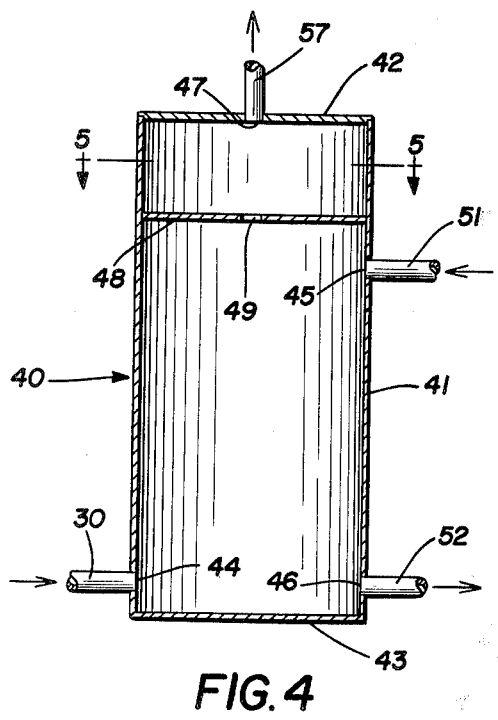
FIG. 4 is an enlarged elevational view, portions of which are broken away and in section, of the converter apparatus of the invention.
Figure 5:
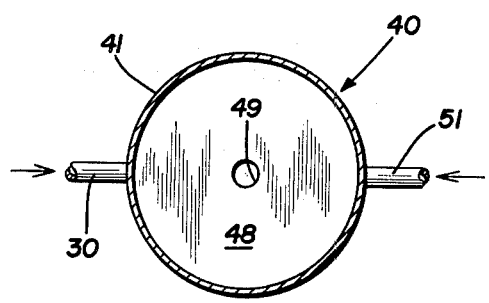
FIG. 5 is a sectional view taken on line 5—5, FIG. 4.

The aqueous waste mixture of sodium hydroxide, sodium chloride and polymeric byproducts, which could include small traces of oil, leaves bottom opening 29 of waste separator 24 through line 30 by a pump 38, and is discharged into a converter, indicated generally at 40. Converter 40 may have various arrangements and configurations, one particular type of which is shown in detail in FIGS. 4 and 5. Converter 40 preferably is a cylindrical-shaped vessel formed of stainless steel having a cylindrical wall 41 enclosed by circular top and bottom walls 42 and 43. An inlet opening 44 is formed adjacent bottom wall 43 and communicates with discharge line 30, and a pair of spaced upper and lower openings 45 and 46 is also formed in cylindrical wall 41. A top discharge opening 47 is formed in top wall 42 and communicates with a discharge line 57. A circular baffle plate 48 formed with a central opening 49 is mounted in the upper portion of converter 40.

Pump 38 runs periodically for short periods of time to keep the aqueous waste mixture from rising above oil outlet opening 34 in separator 24. The aqueous mixture including the polymeric residues in converter 40 are circulated and agitated by a pump 50 which is mounted between circulating lines 51 and 52 which communicate with converter openings 45 and 46, respectively.

Carbon dioxide gas is injected into converter 40 from a pressurized cylinder 53 containing such gas through a line 54 which communicates with lines 51 and 52. A pressure-regulating check valve 55 is mounted in line 54. Recirculating pump 50 agitates the waste byproducts in converter 40 where they are thoroughly mixed with the carbon dioxide gas from cylinder 53. The carbon dioxide gas ($CO_2$) acts upon the sodium hydroxide within converter 40, converting it first to sodium carbonate ($NACO_3 + H_2O$) and then to sodium bicarbonate ($NAHCO_3 + H_2O$) which are both less hazardous substances than the incoming sodium hydroxide. Since both agitation and pressure promotes this transformation, pressure regulator 55 is adjusted to deliver carbon dioxide at a pressure slightly above the setting of a relief valve 56. Relief valve 56 is mounted in outlet line 57 which communicates with discharge opening 47 at the top of converter 40. Thus, regulator 55 may be adjusted to deliver carbon dioxide at 100 psi while relief valve 56 is set to allow material discharge from converter 40 to flow through line 57 at 95 psi. This ensures a constant supply of carbon dioxide gas within converter 40 together with the discharge of waste materials at a pressure of 95 psi.

Each time pump 38 is actuated, a quantity of waste materials enters converter 40 forcing an equal quantity of waste materials out of converter 40 through baffle opening 49 and top outlet opening 47, and into line 57 past relief valve 56. Baffle 48 prevents waste materials entering converter 40 through inlet opening 44 from directly leaving outlet 47 without first being agitated by recirculating pump 50 through lines 51 and 52. This ensures the complete mixing and reduction of the sodium hydroxide with the carbon dioxide gas to form sodium carbonate and sodium bicarbonate, which are both less hazardous substances than the sodium hydroxide.

The specific gravity of the polymer byproduct is such, as well as its affinity for the aqueous mixture, so that it readily leaves the oil and co-mingles with the aqueous mixture in the oil-waste separator 24. Any small amount of polymer which remains in the oil will return to centrifuge 13 through lines 35 and 12 for further separation.

The periodic actuation of pump 38 and the pressure of compressed carbon dioxide gas from cylinder 53 will force the waste materials out of converter 40 through line 57 past check valve 56 where it is collected in waste containers 58. The material leaving converter 40 through line 57 will consist of an aqueous mixture containing sodium carbonate, sodium bicarbonate, and traces of sodium hydroxide and sodium chloride. After the waste material is collected in containers 58, it is transported to and disposed of in a chemical waste dump. Excess undissolved carbon dioxide gas will be discharged to the atmosphere through outlet line 59.

Accordingly, the improved method and apparatus therefor enables all of the excess sodium reagent and byproducts of reaction which are produced during the destruction and removal of polychlorinated biphenyl from a contaminated oil to be transformed into less hazardous substances which can be collected in waste containers for subsequent chemical disposal in landfill dumps without requiring continuous replacement of a filtering medium, as in prior processes, and which salvages nearly all of the decontaminated oil for subsequent reuse in a relatively inexpensive and maintenance-free manner than heretofore believed possible. The advantages are achieved by the mixing of a predetermined amount of water with the oil and byproducts to form an aqueous mixture containing the decontaminated oil, polyphenyl polymer, sodium hydroxide and sodium chloride prior to removing the aqueous mixture from the majority of the decontaminated oil in a centrifuge and the subsequent treatment of the waste mixture with carbon dioxide gas. The amount of water needed to be added to the incoming decontaminated oil and byproducts of reaction is numerically or quantitatively related to the amount of water needed to maintain in solution the sodium chloride formed in the process as well as to the amount of excess sodium which remains after the chemical reaction which destroys the PCBs in order to convert this sodium into sodium hydroxide and to hold the sodium hydroxide in solution. The amount of sodium added to the contaminated oil is within the range of two to four times the stochiometric requirement of sodium needed to be combined with the chlorine in the PCB in order to ensure complete conversion of the PCB in reaction zone 9 during the initial phase of the decontamination process. It is this excess sodium and the polymer that clogs the usual filters and Fuller's earth filter beds heretofore used, resulting in increased costs and lower system efficiency and which resulted in excess amounts of sodium hydroxide being produced which had to be disposed.

Accordingly, the improved method and apparatus are simplified, provide effective, safe, inexpensive and efficient means which achieve all the enumerated objectives, provide for eliminating difficulties encountered with prior methods and devices, and solvent problems and obtain new results in the art.

In the foregoing description, certain terms have been used for brevity, clearness and understanding; but no unnecessary limitations are to be implied therefrom beyond the requirements of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the excess sodium reagent and byproducts of reaction are removed from the oil after the PCBs have been chemically removed therefrom, the new procedures for achieving these results, the characteristics of the apparatus for carrying out the improved procedures, and the advantageous, new and useful results obtained; the new and useful structures, devices, elements, arrangements, parts, and combinations, procedures and methods are set forth in the appended claims.

I claim:

1. A method for the continuous removal of an excess sodium reagent and byproducts of reaction produced during the destruction and separation of polychlorinated biphenyl from a contaminated transformer oil in which said byproducts include sodium chloride and polyphenyl polymer, said method including the steps of:
   (a) providing a continuous flow of the decontaminated oil containing the excess sodium reagent and byproducts of reaction produced during the destruction of the polychlorinated biphenyl in the contaminated transformer oil;
   (b) continuously mixing a predetermined quantity of water with the oil, sodium reagent and byproducts to form an aqueous mixture containing oil, sodium hydroxide and sodium chloride, said quantity of water being continuously sufficient to convert all of the excess sodium to sodium hydroxide and to dissolve and hold in solution said sodium hydroxide;
   (c) continuously supplying said aqueous mixture to a centrifuge;
   (d) continuously removing the separated oil from the centrifuge; and
   (e) removing the waste aqueous mixture remaining in the centrifuge after removal of the oil from the centrifuge for subsequent disposal.

2. The method defined in claim 1 including the steps of injecting the waste aqueous mixture from the centrifuge into a converter chamber; agitating the removed waste mixture in the converter chamber; and injecting carbon dioxide gas into the agitated waste mixture converting most of the sodium hydroxide contained therein into sodium carbonate and sodium bicarbonate.

3. The method defined in claim 2 including the step of removing the sodium carbonate, sodium bicarbonate, sodium hydroxide and sodium chloride contained in the aqueous waste mixture from the converter chamber and storing the same in a container for subsequent disposal.

4. The method defined in claim 3 including the step of maintaining the pressure of the carbon dioxide gas being injected into the agitated waste mixture at a higher pressure than the pressure at which the waste mixture is removed from the converter chamber for storage.

5. The method defined in claim 2 including the step of separating and removing any traces of oil from the waste aqueous mixture after its removal from the centrifuge in a waste separator prior to agitating the waste mixture and mixing it with carbon dioxide gas in the converter chamber.

6. The method defined in claim 5 including the step of injecting the removed traces of oil from the waste aqueous mixture back into an incoming supply of oil and byproducts before centrifuging.

7. The method defined in claim 5 in which the traces of oil are removed from the waste separator by decanting.

8. The method defined in claim 2 including the step of venting to the atmosphere any carbon dioxide gas which does not mix with the waste aqueous mixture in the converter chamber.

9. The method defined in claim 2 in which approximately 99% of the waste products are separated from the oil in the centrifuge.

10. Apparatus for the continuous removal of excess sodium reagent and the byproducts of reaction from decontaminated oil produced during the continuous destruction and removal of polychlorinated biphenyl from contaminated oil, including:
   (a) means for continuously mixing a predetermined quantity of water with the decontaminated oil, excess sodium reagent and byproducts to form an aqueous mixture containing oil, sodium hydroxide and sodium chloride;
   (b) centrifuging means for continuously separating the oil from the aqueous mixture and returning it for reuse, and for periodically discharging the remaining waste materials;
   (c) a supply of carbon dioxide gas;
   (d) means for mixing the carbon dioxide gas from the supply of said gas with the periodically discharged waste materials which remain after the oil has been removed therefrom to form less harmful byproducts; and
   (e) means for collecting and storing the less harmful byproducts produced from mixing the waste materials with the carbon dioxide gas.

11. The apparatus defined in claim 10 in which separator means receives the waste materials from the centrifuging means for removing any oil remaining in said waste materials.

12. The apparatus defined in claim 11 in which the separator means is a vessel having a hollow interior; in which an inlet opening is formed in an upper portion of the vessel and an outlet opening is formed in a lower portion of the vessel; and in which an oil discharge opening is formed in said vessel intermediate the inlet and outlet openings.

13. The apparatus defined in claim 12 in which baffle means is mounted within the hollow interior of the vessel beneath the inlet opening for diffusing the incoming waste materials.

14. The apparatus defined in claim 12 in which pump means operatively communicates with the oil discharge opening of the separator means for removing the oil from said separator means and injecting it back into the centrifuging means.

15. The apparatus defined in claim 12 in which pump means operatively communicates with the outlet opening of the separator means for transferring the remaining waste materials from the separator means to the gas mixing means.

16. The apparatus defined in claim 11 in which the gas mixing means includes a hollow container for receiving the remaining waste materials from the centrifuge means and pump means for agitating the waste materials with the gas.

17. The apparatus defined in claim 16 in which pressure-regulating check valve means is mounted between the gas mixing means and the supply of gas for regulating the pressure of the incoming gas; in which relief valve means is mounted between the gas mixing means and the byproduct collecting and storing means for regulating the pressure at which the byproducts leave the gas mixing means; and in which the pressure-regulating check valve means is set to a higher pressure than the relief valve means.

18. The apparatus defined in claim 16 in which the gas mixing means is formed of stainless steel and has a baffle mounted in an upper portion thereof to provide opening means to affect the flow of the agitated aqueous mixture from said mixing means.

19. The apparatus defined in claim 10 including a pump and a supply of water; and in which the pump injects the predetermined quantity of water from said water supply into the oil and byproducts of reaction.

* * * * *